US012070751B1

(12) United States Patent
Kim et al.

(10) Patent No.: US 12,070,751 B1
(45) Date of Patent: Aug. 27, 2024

(54) APPARATUS AND METHODS FOR SAMPLE ANALYSIS WITH MULTI-GRADIENT MICROFLUIDICS

(71) Applicant: National Technology & Engineering Solutions of Sandia, LLC, Albuquerque, NM (US)

(72) Inventors: Peter Wonhee Kim, Alameda, CA (US); Anup K. Singh, Danville, CA (US); Daniel J. Throckmorton, Tracy, CA (US); James S. Brennan, Rodeo, CA (US); Mark Richard Claudnic, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 409 days.

(21) Appl. No.: 17/178,709

(22) Filed: Feb. 18, 2021

(51) Int. Cl.
*B01L 3/00* (2006.01)

(52) U.S. Cl.
CPC ... *B01L 3/50273* (2013.01); *B01L 2200/0694* (2013.01); *B01L 2300/0883* (2013.01); *B01L 2300/0887* (2013.01); *B01L 2400/0472* (2013.01)

(58) Field of Classification Search
None
See application file for complete search history.

(56) References Cited

U.S. PATENT DOCUMENTS

| | | | | |
|---|---|---|---|---|
| 2011/0003372 | A1* | 1/2011 | Jeon | C12M 41/46 422/68.1 |
| 2016/0263573 | A1* | 9/2016 | Brettschneider | B01L 3/50273 |
| 2018/0320125 | A1* | 11/2018 | Levner | C12M 35/08 |
| 2020/0164368 | A1* | 5/2020 | Zagnoni | B01L 3/502761 |

OTHER PUBLICATIONS

Ye et al., "Cell-based high content screening using an integrated microfluidic device", 2007, Lab Chip, vol. 7, 1696-1704. (Year: 2007).*

(Continued)

*Primary Examiner* — Christine T Mui
*Assistant Examiner* — Kathryn Elizabeth Limbaugh
(74) *Attorney, Agent, or Firm* — Samantha Updegraff; Calfee, Halter & Griswold LLP

(57) ABSTRACT

A device for analyzing biological samples comprises first, second, third, and fourth layers. The first layer comprises a sample chamber in which a sample is positioned. The second layer comprises first, second, and third channels. A third, porous layer is positioned between the first layer and the second layer. A fourth layer composed of a substantially liquid-impermeable material is positioned between the second layer and the third layer. The fourth layer includes first and second pass-through channels that are aligned with the first and second channel, respectively. Fluids that flow in the first and second channels pass through the pass-through channels and diffuse into the sample chamber, establishing a chemical concentration gradient therein. A gas in the sample chamber can diffuse through the third and fourth layers and interact with a fluid flowing in the third channel, establishing a gas concentration gradient in the sample chamber.

20 Claims, 7 Drawing Sheets

(56) References Cited

OTHER PUBLICATIONS

Stanley et al., “Dual-flow-RootChip reveals local adaptations of roots towards environmental asymmetry at the physiological and genetic levels”, 2018, New Phytologist, 217, 1357-1369. (Year: 2018).*
Ahmed, et al., “Bacterial Chemotaxis in Linear and Nonlinear Steady Microfluidic Gradients”, In Nano Lett., Jul. 29, 2010, vol. 10, pp. 3379-3385.
Aran, et al., “Irreversible, direct bonding of nanoporous polymer membranes to PDMS or glass microdevices”, In Lab Chip, Jan. 7, 2010, vol. 10, pp. 548-552.
Chang, et al., “A polydimethylsiloxane-polycarbonate hybrid microfluidic device capable of generating perpendicular chemical and oxygen gradients for cell culture studies”, In Lab Chip, Jul. 18, 2014, vol. 14, pp. 3762-3772.

* cited by examiner

100

APPARATUS AND METHODS FOR SAMPLE ANALYSIS WITH MULTI-GRADIENT MICROFLUIDICS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Analysis of biological and biochemical samples can be difficult for samples that, in their natural environments, are subject to non-uniform conditions or that are not subject to fluid flow conditions. For interest, a soil-root rhizosphere environment in which certain microorganisms live is subject to concentration gradients of chemical secretions from plant roots, oxygen and water concentration gradients, and other non-uniform conditions. Furthermore, except during rain and other flooding conditions, the rhizosphere can be a diffusion environment wherein fluids and chemicals are transported by diffusion rather than fluid flow. These conditions are difficult to reproduce in a controlled manner outside of the rhizosphere environment, inhibiting studies of the response of a microbiome or a specific microbe to various stimuli.

SUMMARY

The following is a brief summary of subject matter that is described in greater detail herein. This summary is not intended to be limiting as to the scope of the claims.

Various technologies pertaining to microfluidics systems that facilitate analysis of biological samples are described herein. With more particularity, microfluidics systems described herein facilitate subjecting a biological sample to a chemical gradient under non-flow fluid conditions, and can further be configured to subject the sample to two or more simultaneous chemical gradients. Technologies described herein are suited to generating a gradient of a single, or multiple chemicals, to mimic the natural environment living organisms experience. Examples of natural environments include, but are not limited to, soil, plants, and mammalian systems including human body. Such a system allows growth of microbes in a manner that closely mimics their natural environment, thereby permitting experimentation and analysis in realistic conditions that are not readily replicable by current cell culture systems.

An exemplary microfluidics system includes a first layer, a second layer, and a third layer. The first layer includes a sample chamber in which a biological sample can be positioned. The second layer comprises a first channel and a second channel. The first channel and the second channel are each configured to accommodate fluids flowing therein. The first channel and the second channel can be separated in the second layer such that the fluids flowing in the first and second channel do not mix in the second layer. The third layer can be a porous layer that is configured to prevent bulk flow of fluids through the third layer but that allows diffusion of a fluid and/or species contained in the fluid across the third layer. The third layer can be positioned between the first layer and the second layer such that the first and second layers are separated by the third layer.

In the exemplary microfluidics system, a first fluid is caused to flow in the first channel, and a second fluid is caused to flow in the second channel. The first fluid can include a buffer and a chemical species. The second fluid can include the buffer and not the chemical species. As the first fluid diffuses through the third layer, the first fluid enters the sample chamber in the first layer and establishes a region of high concentration of the chemical species. As the second fluid diffuses through the third layer, the second fluid enters the sample chamber and defines a region of low, or substantially zero, concentration of the chemical species. As time passes, the chemical species diffuses across the sample chamber from the region of high concentration to the region of low concentration, thereby establishing a gradient of the chemical species across the sample chamber. Thus, a sample in the sample chamber can be subjected to the chemical gradient by flow of the fluids through the first and second channels.

The microfluidics system can further be configured to establish a second gradient in the sample chamber. By way of example, and not limitation, the second layer of the exemplary microfluidics system can further include a third channel, and the microfluidics system can include a fourth layer. The fourth layer can be positioned between the third layer and the second layer, such that, from top to bottom, the microfluidics system includes the second layer, the fourth layer, the third layer, and the first layer. The third channel is configured to accommodate a third fluid such that the third fluid is kept separate from the first and second fluids in the first and second channels, respectively. The fourth layer can be a layer that is substantially fluid-impermeable, but that allows diffusion of gases across the fourth layer. The third fluid can comprise a chemical species that is configured to interact with a gas that is present in the sample chamber. By way of example, and not limitation, the chemical species can be an oxygen-scavenging species. In this non-limiting example, oxygen in the sample chamber can diffuse through the third layer and the fourth layer to reach the second layer and the third fluid disposed in the third channel. The oxygen-scavenging species can consume the oxygen in a chemical reaction. The third channel can be configured such that, when the microfluidics system is assembled, a surface area of the third channel over the sample chamber is greater for a first portion of the third channel than a second portion. Accordingly, the third channel is configured such that a greater amount of oxygen is consumed by the oxygen-scavenging species from a first portion of the sample chamber than from a second portion of the sample chamber, establishing an oxygen gradient from one end of the sample chamber to another.

It is to be understood that a microfluidics system described herein can introduce a gradient of two or more chemicals simultaneously. For example, the same buffer can introduce gradients of oxygen and a metabolite. In various embodiments, the two or more chemicals can be selected so that they do not react or otherwise interfere with one another.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
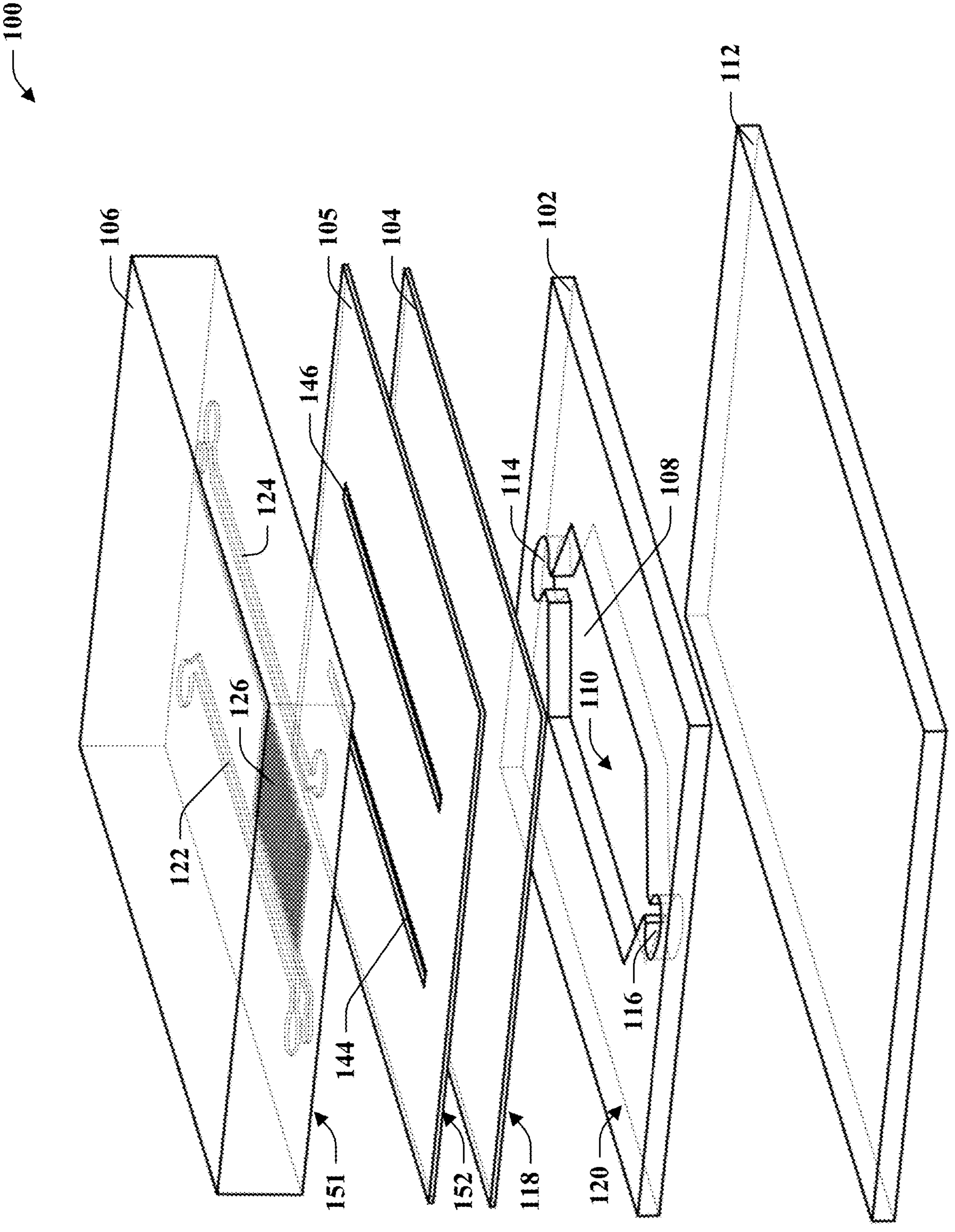
FIG. 1 is an exploded view of an exemplary microfluidics system.

Various technologies pertaining to microfluidics systems that facilitate subjecting a biological sample to a chemical gradient under non-flow fluid conditions, and can further be configured to subject the sample to two or more simultaneous chemical gradients, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the term "fluidic communication" is intended to encompass substantially any means of fluid exchange between two points, regions, areas, objects, or components. For example, the term "A is in fluidic communication with B" means that fluid that is at point A is able to reach point B by any of various means, such as bulk flow or diffusion. As used herein, the term "direct fluidic communication" is intended to encompass bulk fluid flow from one point, region, area, object, or component to another.

With reference to FIG. 1, an exemplary microfluidics system 100 that facilitates establishing chemical gradients in a biological sample chamber is illustrated. The system 100 includes a sample chamber layer 102, a diffusion layer 104, a pass-through layer 105 and a channel layer 106. The diffusion layer 104 is positioned above the sample chamber layer 102 and below the pass-through layer 105. The pass-through layer 105 is positioned above the diffusion layer 104 and below the channel layer 106. Thus, the layers 102-106 are positioned in the microfluidics system 100, from bottom to top as follows: the sample chamber layer 102, the diffusion layer 104, the pass-through layer 105, and the channel layer 106.

Figure 2A:
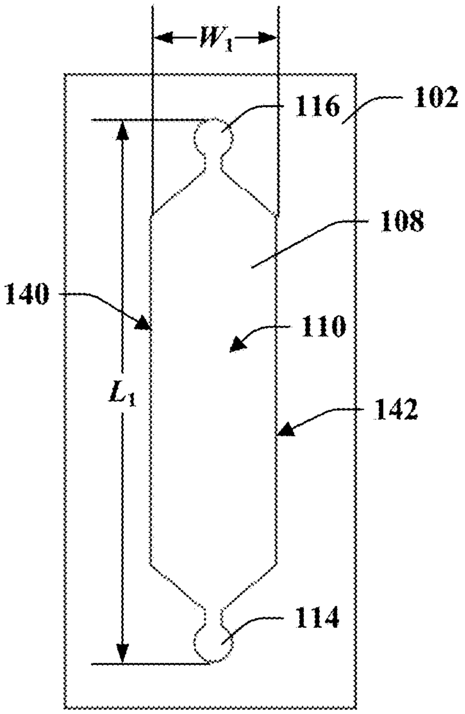
FIG. 2A is a top-down view of an exemplary sample chamber layer.

With reference now to FIGS. 2A-2D, top-down views of the layers 102-106 are illustrated. With reference now solely to FIG. 2A, a top-down view of the sample chamber layer 102 is shown. The sample chamber layer 102 includes a sample chamber 108 that is configured to hold a sample under test. For example, the sample chamber 108 can be configured to contain a cell culture, a tissue sample, a soil sample containing microorganisms, or substantially any other sample that is desirably subjected to a chemical gradient. The sample chamber 108 can be formed as a depression in the sample chamber layer 102. In some embodiments, the sample chamber 108 can have a bottom surface 110 that is formed as part of the sample chamber layer 102. In other embodiments, and referring again briefly to FIG. 1, the sample chamber layer 102 can be bonded to a glass layer 112 (e.g., a glass slide). In such embodiments, the glass layer 112 can form a bottom surface of the sample chamber 108. The sample chamber 108 can have substantially any shape. For instance, while the sample chamber 108 in the system 100 shown has a greater length $L_1$ than width $W_1$, the sample chamber 108 can instead have a regular shape such as a square or circular shape.

The sample chamber layer 102 can further include a first input port 114 and a second input port 116 that are each in direct fluidic communication with the sample chamber 108. In various embodiments, a sample that is desirably analyzed using the microfluidics system 100 can be positioned in the sample chamber 108 by way of the input ports 114, 116. For example, a syringe can be coupled to one of the input ports 114, 116, and a fluid containing a biological sample can be inserted into the sample chamber 108 through one of the ports 114, 116 by action of the syringe. In another example, the ports 114, 116 can be connected to a pump system (not shown) that is controllable to deliver a fluid containing a biological sample to the sample chamber 108 by way of the ports 114, 116. In still further examples, the ports 114, 116 can be used to take samples from a biological sample positioned in the sample chamber 108 while an experiment is being performed.

Referring once again to FIG. 1, the diffusion layer 104 is positioned above the sample chamber layer 102. When the system 100 is assembled, a bottom surface 118 of the diffusion layer 104 is in contact with a top surface 120 of the sample chamber layer 102, such that a seal is formed between the two layers 102, 104. The diffusion layer 104 can be co-extensive with the sample chamber layer 102. For example, the diffusion layer 104 can have a same length and width as the sample chamber layer 102. In embodiments wherein the sample chamber layer 102 has a non-rectangular geometry (e.g., the sample chamber layer 102 has a circular exterior boundary), an exterior boundary of the diffusion layer 104 can have a same shape as an exterior boundary of the sample chamber layer 102.

Briefly, and as will be described in greater detail below, the channel layer 106 is configured to facilitate delivery of one or more fluids or chemical species to a sample in the sample chamber 108, such that the sample is subjected to a gradient of the fluid or chemical species. The channel layer 106 is positioned above the diffusion layer 104 such that the diffusion layer 104 interposes between the channel layer 106 and the sample chamber layer 102.

The diffusion layer 104 is configured to prevent bulk flow of fluids across the diffusion layer 104 (e.g., from the channel layer 106 to the sample chamber layer 102), while allowing various chemical species to diffuse across the diffusion layer 104. The diffusion layer 104 can therefore isolate the sample chamber 108 from convection forces caused by fluid flow, which convection forces can disturb or damage a sample in the sample chamber 108. For instance, in the soil rhizosphere environment, fluid and chemical transport can occur primarily by way of diffusion rather than bulk fluid transport. The microfluidics system 100 is configured to better simulate these conditions than systems that rely on bulk fluid flow to deliver fluids and chemical species to samples.

Figure 2B:
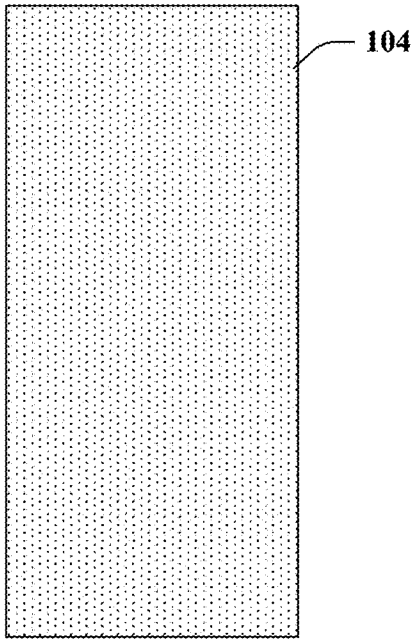
FIG. 2B is a top-down view of an exemplary diffusion layer.

Referring now to FIG. 2B, a top-down view of the diffusion layer 104 is shown. In exemplary embodiments, the diffusion layer 104 is a porous membrane. A thickness, t, a number of pores, and/or a pore size of pores in the diffusion layer 104 can be selected to yield a specified effective diffusivity of the diffusion layer 104 with respect to a selected chemical species. The diffusion layer 104 can be formed from a plastic such as polycarbonate. In various non-limiting examples, the diffusion layer 104 can have a thickness that is less than or equal to about 200 micrometers, less than or equal to about 150 micrometers, or less than or equal to about 100 micrometers. In further exemplary embodiments, the diffusion layer 104 can have pores that are less than about 2 micrometers wide. For instance, the pores can have a diameter of between 0.1 micrometers to 2 micrometers, 0.1 to 1 micrometers, or 0.2 to 1 micrometers. In a specific exemplary embodiment, the diffusion layer 104 can be a polycarbonate membrane with pores having a diameter of about 0.2 micrometers.

Figure 2C:
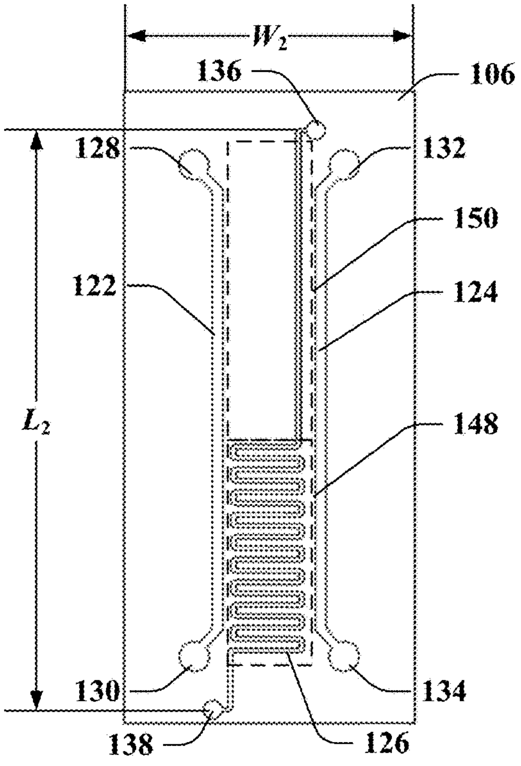
FIG. 2C is a top-down view of an exemplary channel layer.

Referring now to FIG. 2C, a top-down view of the channel layer 106 is shown. As noted above, the channel layer 106 is configured to facilitate delivery of fluids and/or chemical species to the sample chamber 108 by way of diffusion. The channel layer 106 can further be configured to simultaneously establish multiple chemical gradients within the sample chamber 108. The channel layer 106 comprises a first channel 122, a second channel 124, and a third channel 126. The channel layer 106 includes a first port 128 and a second port 130 that are in direct fluidic communication with the first channel 122. The channel layer 106 includes a third port 132 and a fourth port 134 that are in direct fluidic communication with the second channel 124. The channel layer 106 further includes a fifth port 136 and a sixth port 138 that are in direct fluidic communication with the third channel 126. The ports 128-138 can be used to control flow of various fluids through the channels 122-126. The channels 122-126 are separated from one another in the channel layer 106 such that, within the channel layer 106, fluids flowing in the channels 122-126 do not mix with one another.

Figure 3:
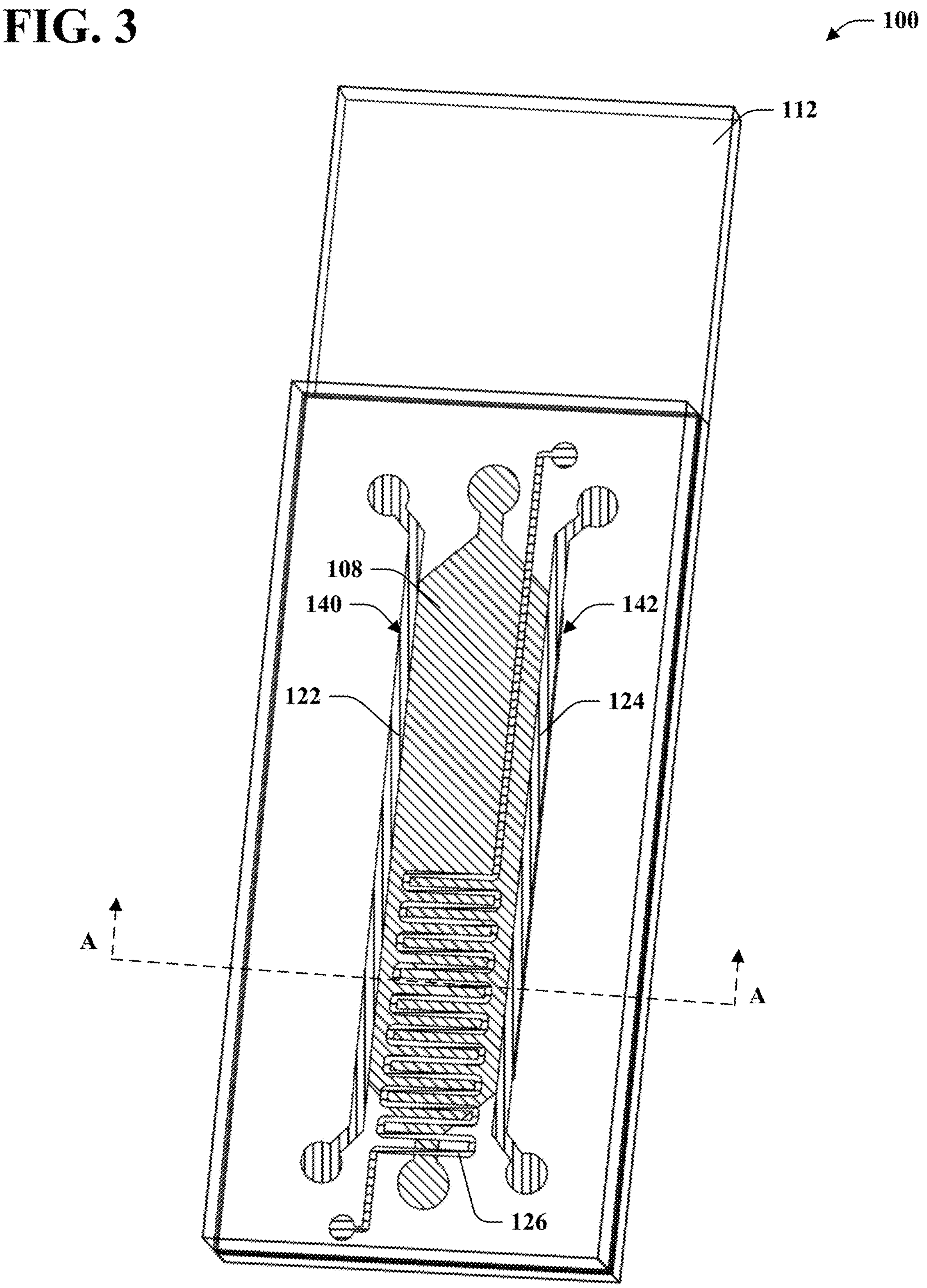
FIG. 3 is a perspective view of the exemplary microfluidics system of FIG. 1.

The channels 122-126 extend along a length of the channel layer 106. When the microfluidics system 100 is assembled, the channels 122-126 are positioned such that they extend along a same direction as the length $L_1$ of the sample chamber 108. Referring now to FIG. 3, a perspective view of the microfluidics system 100 is shown. The first channel 122 extends, within the channel layer 106, along and above a first side 140 of the sample chamber 108 (positioned in the sample chamber layer 102). The second channel 124 extends, within the channel layer 106, along and above a second side 142 of the sample chamber 108.

The first and second channels 122, 124 are configured to establish a chemical gradient in the sample chamber 108 from the first side 140 of the chamber 108 to the second side 142 of the chamber 108. The chemical gradient is a gradient of chemical concentration of a chemical species that is present in a fluid that flows in one of the first or second channels 122, 124. The gradient is established by causing a first fluid that contains the chemical species to flow through one of the first or second channels 122, 124, while causing a second fluid to flow through the other of the first or second channels 122, 124. The second fluid is a fluid that either does not contain the chemical species or has a lesser concentration of the chemical species than the first fluid. In exemplary embodiments, the first fluid comprises a buffer and the chemical species, and the second fluid consists solely of the buffer. In other embodiments, the first fluid can comprise a buffer and a first concentration of the chemical species, whereas the second fluid comprises a buffer and a second concentration of the chemical species, the second concentration being less than the first concentration.

Figure 2D:
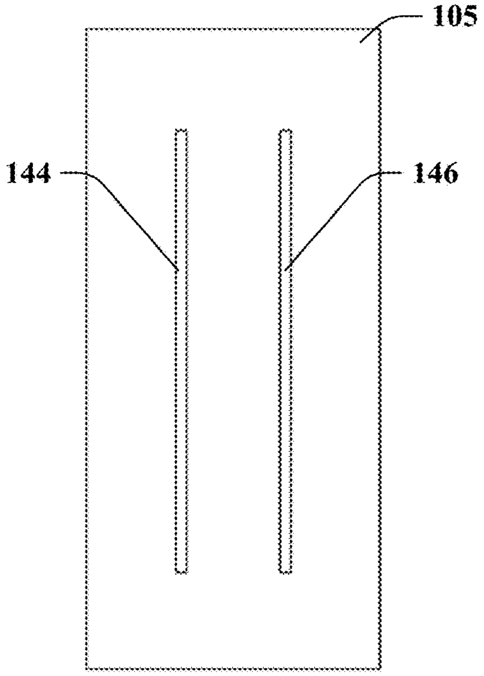
FIG. 2D is a top-down view of an exemplary pass-through layer.

Referring briefly to FIG. 1 and FIG. 2D, the pass-through layer 105 is a substantially fluid-impermeable layer that has a first slot or channel 144 and a second slot or channel 146 formed therein. The slots 144, 146 can be positioned in the pass-through layer 105 such that, when the layers 102-106 of the microfluidics system 100 are assembled, the slots 144, 146 are aligned with the first and second channels 122, 124 of the channel layer 106. In other words, when the microfluidics system 100 is assembled, fluids that flow in the channels 122, 124 pass through the slots 144, 146 in the pass-through layer 105 and reach the diffusion layer 104.

Referring once again to FIG. 3, the first fluid (flowing through the first channel 122), and a chemical species present therein, diffuses through the diffusion layer 104 and into the sample chamber 108 along the first side 140 of the chamber 108. The second fluid diffuses through the diffusion layer 104 and into the sample chamber 108 along the second side 142 of the chamber 108. The diffusion of the fluids from the first and second channels 122, 124 into the sample chamber 108 results in a difference in concentration of the chemical species between the first side 140 of the sample chamber 108 and the second side 142 of the sample chamber 108. Due to this difference in concentration, the chemical species present at the first side 140 of the chamber 108 diffuses across the width $W_1$ of the chamber 108 toward the second side 142 of the chamber 108, thereby establishing a gradient of concentration of the chemical species within the sample chamber 108 that extends across the width $W_1$ of the chamber 108. The chemical gradient can be substantially uniform along the length $L_1$ of the chamber 108. In some embodiments, however, one or both of the first and second channels 122, 124 can have a surface area above the sample chamber 108 that varies along the length $L_1$ of the sample chamber 108. In such embodiments, the chemical gradient can vary along the length $L_1$ of the chamber 108 as well as along the width $W_1$.

In various embodiments, the channels 122, 124 can be used to establish multiple chemical gradients simultaneously. For example, the first fluid, flowing through the first channel 122, can include a buffer, a first chemical species, and a second chemical species. The second fluid can be or include a buffer (e.g., the same buffer as in the first fluid). As the first and second fluids diffuse through the diffusion layer 104 and into the sample chamber 108, a first gradient of concentration of the first chemical species is established in the sample chamber 108 (e.g., across its width $W_1$). Further, a second gradient of concentration of the second chemical species is established in the sample chamber 108 simultaneously with the first gradient of concentration of the first chemical species. The microfluidics system 100 can therefore be used to establish multiple chemical concentration gradients in the sample chamber 108 simultaneously. It is to be understood that substantially any number of concentration gradients can be established by including additional chemical species in one of or both of the first fluid or the second fluid. In various embodiments, the chemical species are selected to be non-reactive with respect to one another. In other embodiments, however, the species can react with one another within the sample chamber 108.

The microfluidics system 100 is further configured to establish a gas-concentration gradient in the sample chamber 108, in addition to the chemical gradient (or gradients) established by the fluids flowing through the first and second channels 122, 124 of the channel layer 106. The gas-concentration gradient is established in the sample chamber 108 by flowing a third fluid through the third channel 126 of the channel layer 106, the third fluid configured to consume a gas that is present in the sample chamber 108, referred to herein as a target gas. By way of example, and not limitation, the third fluid can be or include pyrogallol, an oxygen-scavenging species, and the target gas is oxygen.

Referring now to FIGS. 2C and 2D, the pass-through layer 105 does not include a slot or channel that is aligned with the third channel 126. The pass-through layer 105 is liquid impermeable, and the third fluid is prevented from reaching the diffusion layer 104 (and then diffusing into the sample chamber 108) by the pass-through layer 105. However, gases are able to diffuse through the diffusion layer 104 and the pass-through layer 105. When the third fluid flows in the third channel 126, a target gas in the sample chamber 108 diffuses through the diffusion layer 104 and the pass-through layer 105 and reaches the third fluid. The target gas is consumed by the third fluid, e.g., by a chemical reaction with the third fluid.

Figure 2E:
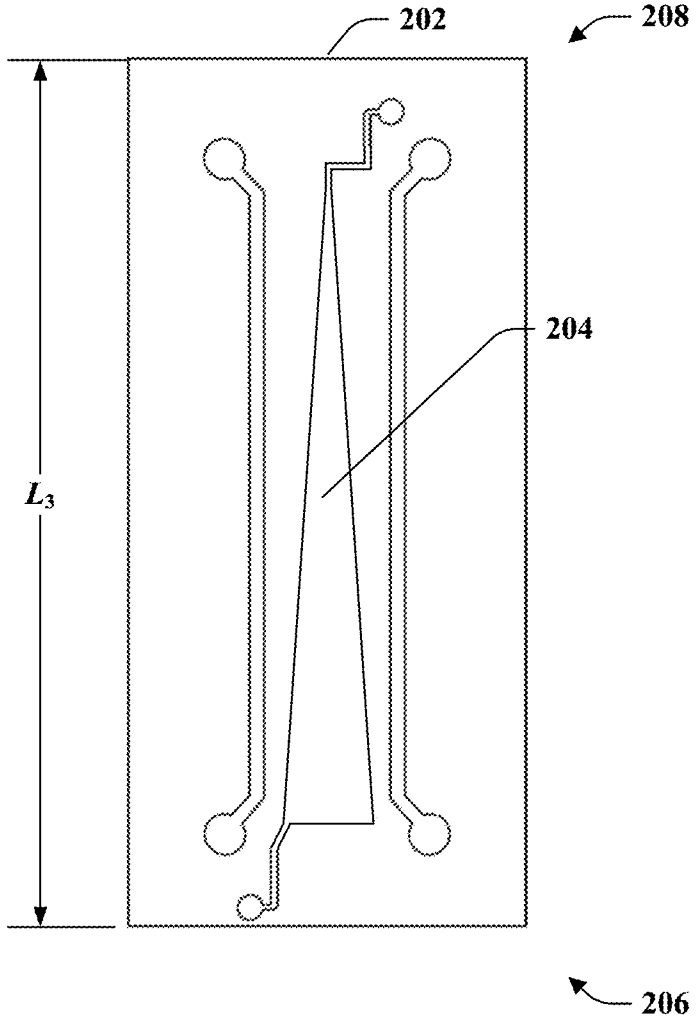
FIG. 2E is a top-down view of another exemplary channel layer.

The third channel 126 is configured such that the third channel 126 has a variable surface area over the sample chamber 108 along the length $L_2$ of the third channel 126. Stated differently, along the length $L_2$ of the third channel 126, portions of the third channel 126 having a same length can have different areas in the plane of the channel layer 106. By way of example, and as shown in FIG. 2C, the third channel 126 can include a serpentine portion 148 and a straight portion 150. The serpentine portion 148 of the third channel 126 has a plurality of turns, such that a path of the third channel 126 snakes back and forth along a width $W_2$ of the channel layer 106 down the length of the third channel 126. By virtue of the serpentine path of the third channel 126 within the serpentine portion 148, along equal portions of the length $L_2$, the serpentine portion 148 has a greater surface area in the plane of the channel layer 106 than the straight portion 150. In other embodiments, the third channel 126 that carries the third fluid can have a different geometry. For example, and referring now to FIG. 2E, another exemplary channel layer 202 is shown, wherein the channel layer 202 includes a channel 204 for accommodating the third fluid, wherein the channel 204 tapers along a length $L_3$ of the channel layer 202. Thus, the channel 204 has a greater surface area in the plane of the channel layer 202 at a first end 206 of the channel layer 202 than at a second end 208 of the channel layer 202.

Referring once again to FIGS. 1, 2A, and 2C, when gases diffuse upward from the sample chamber 108 through the diffusion layer 104 and the pass-through layer 105, the target gas is more readily consumed from a portion of the sample chamber 108 that is disposed below the serpentine portion 148 (e.g., a portion proximal to the first port 114 of the sample chamber 108) than from a portion of the sample chamber 108 that is disposed below the straight portion 150 of the third channel 126 (e.g., a portion proximal to the second port 116 of the sample chamber 108). As a result, a concentration of the target-gas in the portion of the sample chamber 108 disposed below the serpentine portion 148 (e.g., near the first port 114) is lower than a concentration of the target-gas in the portion of the sample chamber disposed below the straight portion 150 (e.g., near the second port 116). The difference in concentration of the target gas between, e.g., a region near the first port 114 and a region near the second port 116 in the sample chamber 108, causes a gradient of concentration of the target gas to be established within the sample chamber 108, extending along the length $L_1$ of the sample chamber 108.

The microfluidics system 100 is therefore suited to simultaneously establishing chemical and target-gas gradients in the sample chamber 108. The microfluidics system 100 is further suited to establishing these gradients orthogonally, such that the chemical gradient has a variation oriented along the width $W_1$ of the sample chamber 108 and the target-gas gradient has a variation oriented along the length $L_1$ of the sample chamber 108.

From the foregoing, it is also to be appreciated that in at least some embodiments, a microfluidics system can be configured to establish a single chemical gradient across the sample chamber 108. By way of example, in the microfluidics system 100, the pass-through layer 105 and the third channel 126 can be omitted, and the channels 122, 124 can still be used to form a chemical gradient in the sample chamber 108 by diffusion of chemical species through the diffusion layer 104.

Figure 4:
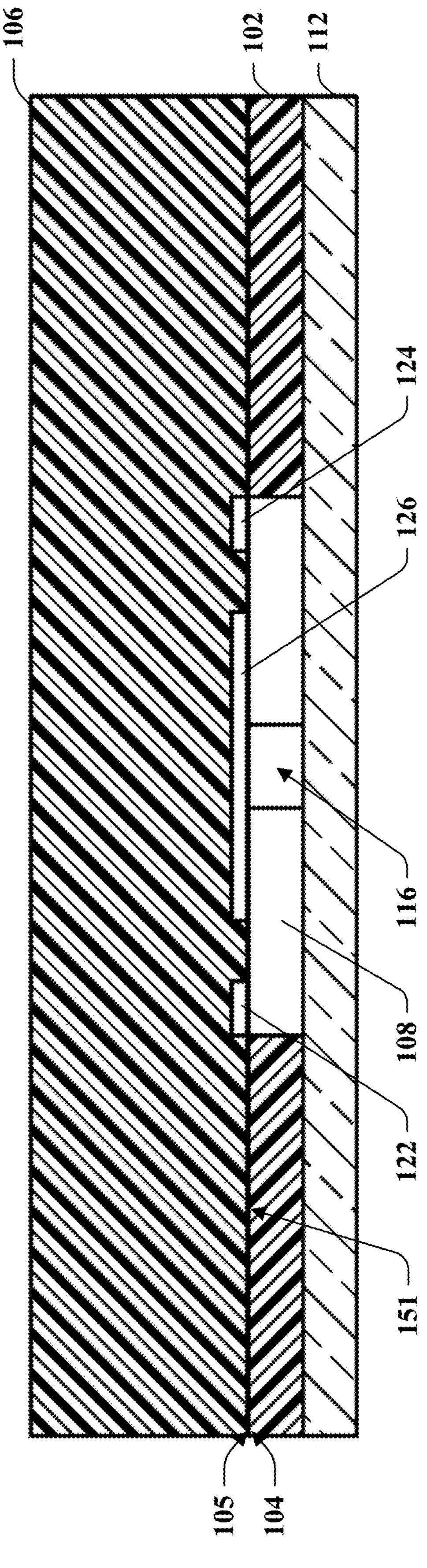
FIG. 4 is a cross-sectional side view of the exemplary microfluidics system of FIGS. 1 and 3.

Referring now to FIG. 4, a cross-sectional view of the microfluidics system 100 cut along line A-A shown in FIG. 3 is illustrated. The channels 122-126 in the channel layer 106 are formed so that the channels 122-126 are open at a bottom surface 151 of the channel layer 106. In other words, fluids flowing in the channels 122-126 are in direct contact with the layers 104, 105 disposed below the channel layer 106. The first and second fluids flowing in the first and second channels 122, 124, respectively, are in direct contact with the diffusion layer 104 (by virtue of the slots 144, 146 in the pass-through layer 105). The third fluid flowing in the third channel 126 is in direct contact with the pass-through layer 105, since no opening is formed in the pass-through layer 105 beneath the third channel 126. None of the fluids is in direct fluidic communication with the sample chamber 108 by virtue of the diffusion layer 104 and the pass-through layer 105 interposing between the channel layer 106 and the sample chamber layer 102.

The various layers 102-106 of the microfluidics system 100 can be formed from any of various materials. In exemplary embodiments, the layers 102-106 are composed of various plastics. By way of example, and not limitation, the sample chamber layer 102, the pass-through layer 105, and the channel layer 106 can be formed from polydimethylsiloxane (PDMS). PDMS is elastic and suitable for forming by way of soft lithography. PDMS is therefore well-suited to forming the layers 102, 105, 106 to have small, micro-scale features (e.g., having a dimension that is less than 100 micrometers), and to forming liquid-tight seals between the various layers 102-106 when they are bonded together. It is to be understood however, that in some embodiments the sample chamber layer 102, the pass-through layer 105, and the channel layer 106 can be formed of rigid materials. In such embodiments and consistent with the present disclosure, sealing layers or gaskets can be employed in between various of the layers 102, 105, 106 in order to facilitate sealing against fluid leaks between the layers 102, 105, 106 and/or out of the microfluidics system 100. In various exemplary embodiments, the diffusion layer can be formed from an inorganic material such as ceramics, glasses, or metals, or an organic material including different classes of polymers such as nylon, polycarbonate, nafion, cellulose, etc.

In embodiments wherein the sample chamber layer 102 and the channel layer 105 are composed of PDMS, the sample chamber layer 102 and the channel layer 106 can be formed by pouring uncured PDMS into a mold, de-gassing the PDMS in a vacuum chamber, and baking the mold and PDMS together (e.g., at about 80 degrees Celsius). After baking, the PDMS hardens and the formed layer can be removed from the mold. In embodiments wherein the pass-through layer 105 is formed from PDMS, the pass-through layer can be formed as a thin membrane by spin-coating a PDMS mix (e.g., having a 10:1 ratio of a monomer to a cross-linker) onto a silicon wafer.

In connection with assembling the microfluidics system 100, the various layers 102-106 can be bonded together to ensure liquid-tight seals. In embodiments wherein the diffusion layer 104 is formed from polycarbonate, the diffusion layer 104 can be bonded to the pass-through layer 105 and the sample chamber layer 102. The bonding can be performed by functionalizing surfaces of the diffusion layer 104 with an amine group by (3-aminopropyl)triethoxysilane (APTES), functionalizing a bottom surface 152 of the pass-through layer 105 and the top surface 120 of the sample chamber layer 102 with a hydroxyl group, and then pressing the pass-through layer 105 and the sample chamber layer 102 against the diffusion layer 104. The sample chamber layer 102 can further be oxygen plasma bonded to the glass slide 112.

Figure 5A:
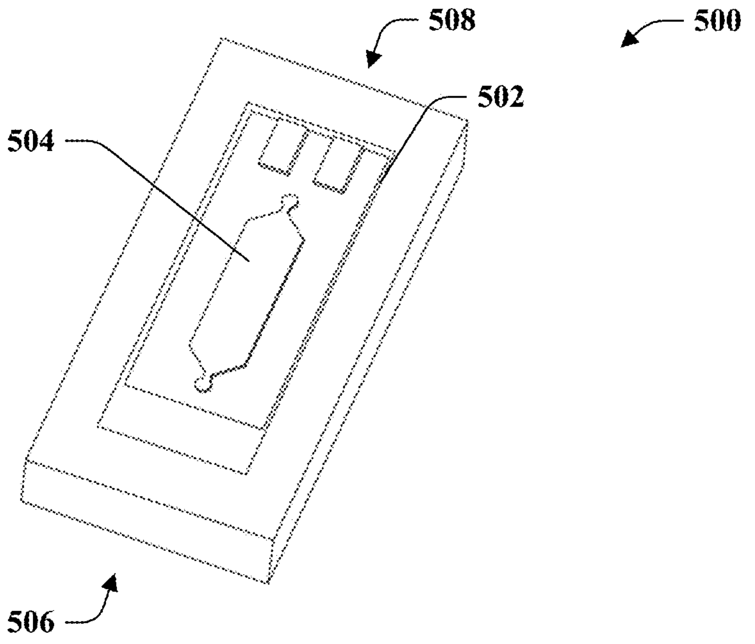
FIGS. 5A-5C are perspective views of an exemplary mold for forming a sample chamber layer.
Figure 5B:
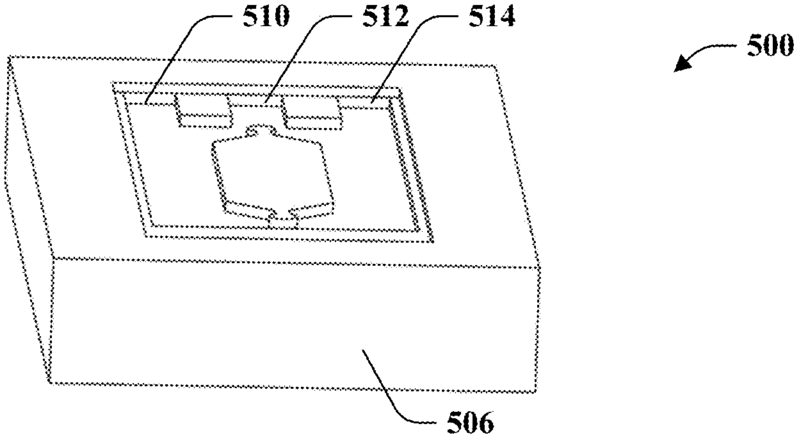
Figure 5C:
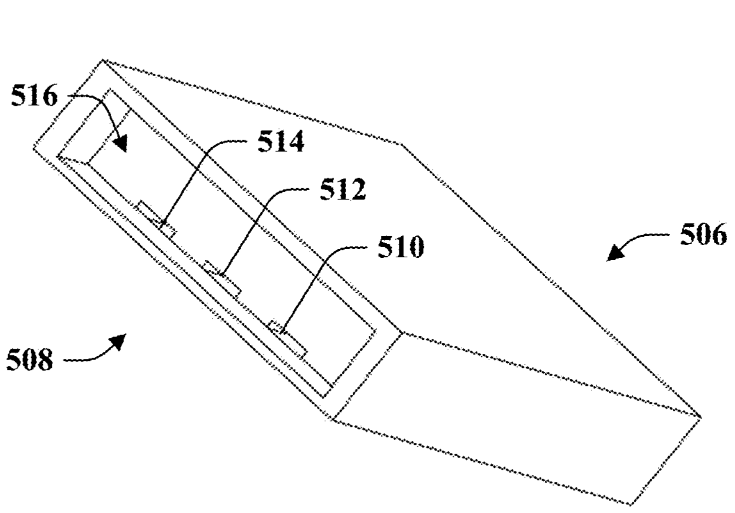

Referring now to FIGS. 5A-5C, perspective views of an exemplary mold 500 for forming the sample chamber layer 102 are illustrated. The mold 500 facilitates formation of the sample chamber layer 102 from a plastic material (e.g., PDMS) while mitigating bubble formation in the layer 102. While the exemplary mold 500 is described herein in connection with forming the sample chamber layer 102, it is to be understood that molds for forming other layers (e.g., the channel layer 106) can be constructed in similar fashion.

The mold 500 includes a casting chamber 502. The casting chamber 502 includes a feature 504 formed therein, wherein the feature is a negative of a feature that is desirably formed in the sample chamber layer 102. For example, the feature 504 is a raised portion that is the negative of the depression that makes up the sample chamber 108 in the sample chamber layer 102. A cover (not shown) can be placed over the casting chamber 502 and affixed to the mold 500 (e.g., by way of fasteners, an adhesive, a vise, etc.). The cover can be placed either after the casting material is cast in the casting chamber 502, or prior to casting the casting material in the casting chamber 502, as will be described below. The mold 500 can then be baked with the casting material therein to cure the casting material and form the sample chamber layer 102.

FIG. 5B shows a perspective view of the mold 500 looking from a first end 506 of the mold 500 toward a second end 508 of the mold 500. The mold 500 includes casting holes 510-514 that are formed at the second end 508 of the mold 500. The casting holes 510-514 extend from the casting chamber 502 to the exterior of the mold 500 to allow a casting material to be cast in the casting chamber 502 while a cover is in place over the casting chamber 502. FIG. 5C shows a perspective view of the mold 500 looking from the second end 508 of the mold 500 toward the first end 506 of the mold 500. As shown in FIG. 5C, the mold 500 includes a reservoir 516 into which a casting material (e.g., PDMS) can be poured, whereupon the casting material flows through the casting holes 510-514 and into the casting chamber 502.

Figure 6:
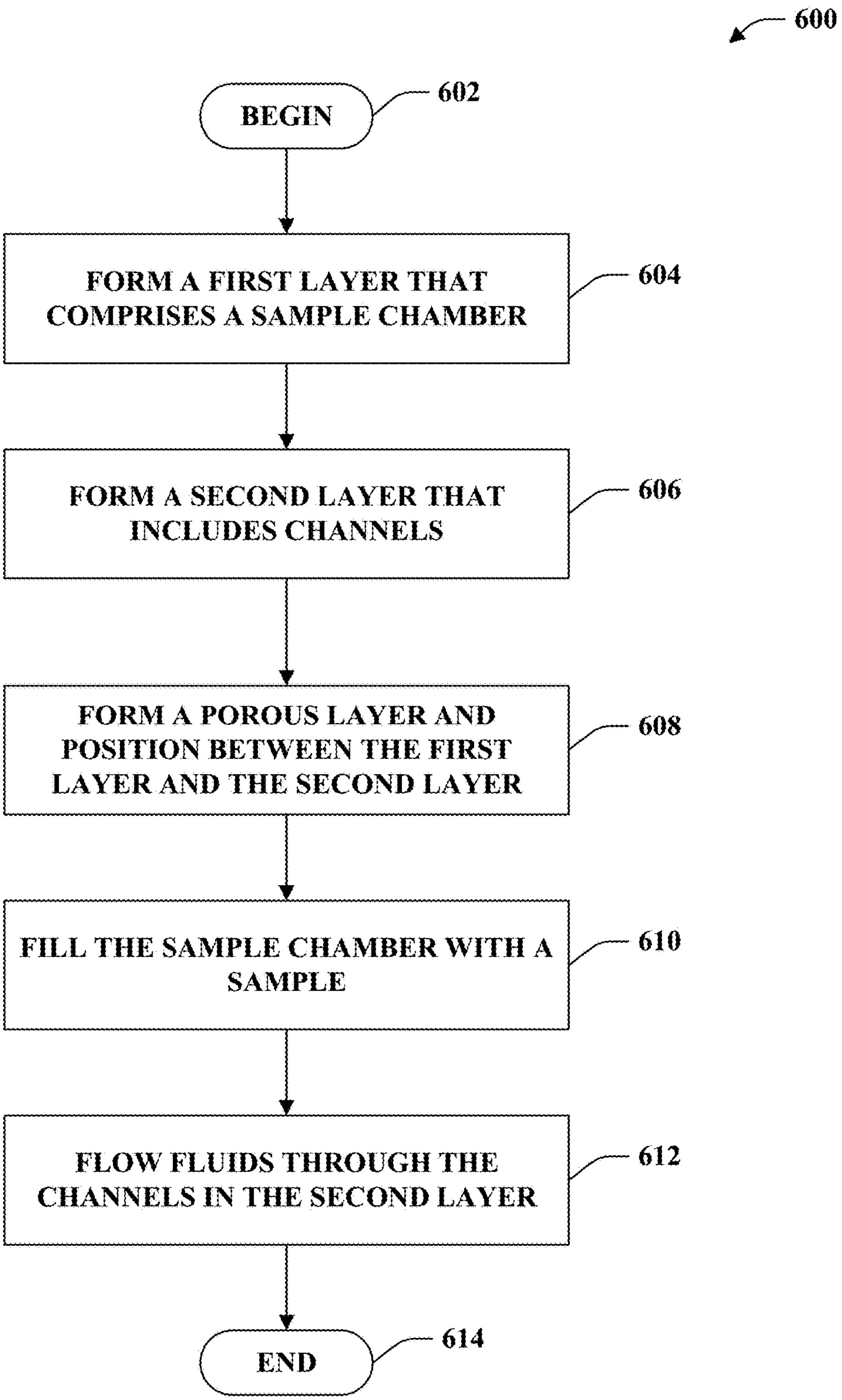
FIG. 6 is a flow diagram that illustrates an exemplary methodology for making and using a microfluidics system.

FIG. 6 illustrates an exemplary methodology relating to establishing a chemical concentration gradient and optionally establishing a gas concentration gradient in a sample chamber. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 6, a methodology 600 that facilitates establishing chemical- and gas-concentration gradients by way of a microfluidics system is illustrated. The methodology 600 begins at 602, and at 604, a first layer that comprises a sample chamber is formed. The first layer can be formed as, for example, the sample chamber layer 102. The first layer can be formed by mold casting, as described above with respect to FIG. 5. At 606, a second layer is formed that includes channels for accommodating fluids. The second layer can include a first channel and a second channel that are separated from one another. The first channel and the second channel can be positioned such that, when the first layer and the second layer are aligned, the first channel and the second channel are positioned on opposing sides of the sample chamber in the first layer. The second layer can further optionally include a third channel positioned between the first channel and the second channel, such that second layer is configured in similar manner to the channel layer 106. At 608, a porous layer is formed and positioned between the first layer and the second layer. The porous layer can allow diffusion of liquids from channels in the second layer into the sample chamber in the first layer. At 610, the sample chamber in the first layer is filled with a sample. By way of example, the sample chamber can be loaded with a fluid medium that has a microbial species disposed therein. At 612, fluids are flowed through channels in the second layer. For example, a first fluid that contains a chemical species can be flowed through the first channel and a second fluid that does not contain the chemical species can be flowed through the second channel. As the fluids flow in the channels, the fluids diffuse through the porous layer formed at 608, and enter the sample chamber in the first layer. A difference in concentration of the chemical species between opposing sides of the sample chamber is established by diffusion of the fluids. Diffusion, within the sample chamber, causes a gradient of the chemical species to be established across the sample chamber. A third fluid can optionally be flowed in the optional third channel at 612 to establish a gas-concentration gradient in the sample chamber, in similar manner as described above with respect to the third channel 126. The methodology 600 completes at 614.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
- a first layer that comprises a sample chamber that is adapted to retain a biological sample;
- a second layer that comprises:
  - a first channel having a first fluid therein, where the first channel is positioned directly above a first side of the sample chamber; and
  - a second channel having a second fluid therein, the second channel being in parallel with the first channel and further being fluidically separated from the first channel within the second layer such that the first fluid and the second fluid do not mix in the second layer, where the second channel is positioned directly above a second side of the sample chamber that opposes the first side; and
- a third porous layer that is positioned between the first layer and the second layer, wherein the first fluid and the second fluid diffuse through the third layer and into the sample chamber to mimic transport of fluid in a rhizosphere environment relative to the biological sample retained in the sample chamber.

2. The apparatus of claim 1, the first fluid comprising a buffer and a chemical species, the second fluid comprising the buffer, wherein diffusion of the first fluid and the second fluid through the third layer causes a gradient of the chemical species to be established in the sample chamber.

3. The apparatus of claim 1, the first fluid comprising a buffer, a first chemical species, and a second chemical species, the second fluid comprising the buffer, wherein diffusion of the first fluid and the second fluid through the third layer causes a first gradient of the first chemical species and a second gradient of the second chemical species to be established in the sample chamber.

4. The apparatus of claim 1, wherein at least one of the first layer or the second layer comprises polydimethylsiloxane (PDMS).

5. The apparatus of claim 1, wherein the third porous layer comprises one of:
- a ceramic material;
- a glass;
- a metal; or
- a polymer.

6. The apparatus of claim 1, wherein the second layer further comprises a third channel that is separated from the first channel and the second channel, the third channel having a third fluid therein, the apparatus further comprises:
- a fourth layer that is positioned between the second layer and the third layer, wherein the fourth layer is substantially fluid impermeable, the fourth layer comprising:
  - a first pass-through channel aligned with the first channel; and
  - a second pass-through channel aligned with the second channel, wherein the first and second fluids pass through the first pass-through channel and the second-pass through channel, respectively, prior to diffusing through the third layer and into the sample chamber, and wherein further the third fluid is prevented from reaching the third layer by the fourth layer.

7. The apparatus of claim 6, wherein a gas present in the sample chamber diffuses through the third and fourth layers and interacts with the third fluid present in the third channel.

8. The apparatus of claim 7, wherein the gas is oxygen, wherein the third fluid comprises an oxygen-absorbing species.

9. The apparatus of claim 8, wherein the oxygen-absorbing species is pyrogallol.

10. The apparatus of claim 6, wherein the third channel has a length that extends along a length of the second layer, wherein a width of the third channel tapers along the length of the third channel.

11. The apparatus of claim 6, wherein the third channel comprises a serpentine portion.

12. The apparatus of claim 6, wherein the fourth layer comprises polydimethylsiloxane (PDMS).

13. The apparatus of claim 6, wherein the third channel is positioned between the first channel and the second channel on the second layer.

14. A method, comprising:
- forming a first layer that comprises a sample chamber;
- forming a second layer such that the second layer comprises:
  - a first channel that is positioned directly above the sample chamber on a first side of the sample chamber; and
  - a second channel that extends in parallel with the first channel and is positioned directly above the sample chamber on a second side of the sample chamber that opposes the first side, the second channel fluidically separated from the first channel within the second layer;
- forming a third porous layer that is positioned between the first layer and the second layer;
- placing a biological sample in the sample chamber;
- flowing a first fluid through the first channel, the first fluid comprising a buffer;
- flowing a second fluid through the second channel, the second fluid comprising a buffer and a chemical species, wherein the first fluid and second fluid diffuse through the third porous layer and establish a gradient of the chemical species in the sample chamber to mimic transport of fluid in a rhizosphere environment relative to the biological sample in the sample chamber, and further wherein due to the first channel and the second channel being fluidically separated, the first fluid and the second fluid do not mix in the second layer.

15. The method of claim 14, wherein the second layer is formed such that the second layer further comprises a third channel, the method further comprising flowing a third fluid through the third channel, the third fluid comprising an oxygen-scavenging chemical, wherein flow of the third fluid through the third channel causes oxygen to diffuse through the third porous layer and to be absorbed by the oxygen-scavenging chemical.

16. The method of claim 15, wherein the third channel is configured such that absorption of oxygen by the oxygen-scavenging chemical in the third channel establishes an oxygen concentration gradient in the sample chamber.

17. The method of claim 15, further comprising forming a fourth layer that is positioned between the third porous layer and the second layer, the fourth layer substantially impermeable to the third fluid.

18. The method of claim 14, further comprising oxygen plasma bonding the first layer to a glass slide.

19. A system comprising:

a first layer that comprises a sample chamber that is configured to have a biological sample positioned therein;

a second layer that comprises:

a first channel having a first fluid therein;

a second channel having a second fluid therein, where the second channel extends in parallel with the first channel; and a third channel having a third fluid therein, wherein the first channel, the second channel, and the third channel are fluidically separated from one another in the second layer such that the first fluid, the second fluid, and the third fluid do not mix in the second layer, and further wherein each of the first channel, the second channel, and the third channel are positioned directly above corresponding portions of the sample chamber;

a third, fluid-impermeable layer positioned between the first layer and the second layer, the third layer comprising:

a first pass-through channel aligned with the first channel in the first layer; and a second pass-through channel aligned with the second channel in the second layer; and a fourth, porous layer positioned between the third layer and the first layer, wherein the first fluid and the second fluid pass through the third layer by way of the first and second pass-through channels, respectively, wherein the first and second fluids diffuse through the fourth layer into the sample chamber, wherein further a gas in the sample chamber diffuses through the third layer and the fourth layer and interacts with the third fluid in the third channel thereby forming a gradient of the gas in the sample chamber, and further where diffusion of the first and second fluids through the fourth layer into the sample chamber mimics transport of fluid in a rhizosphere environment relative to the biological sample positioned in the sample chamber.

20. The system of claim 19, wherein the first and second fluids establish a chemical concentration gradient in the sample chamber, the chemical concentration gradient having a first direction of increase, and wherein the diffusion of the gas through the third layer establishes an oxygen concentration gradient in the sample chamber, the oxygen concentration gradient having a second direction of increase that is substantially perpendicular to the first direction of increase.

* * * * *